Figure 1:
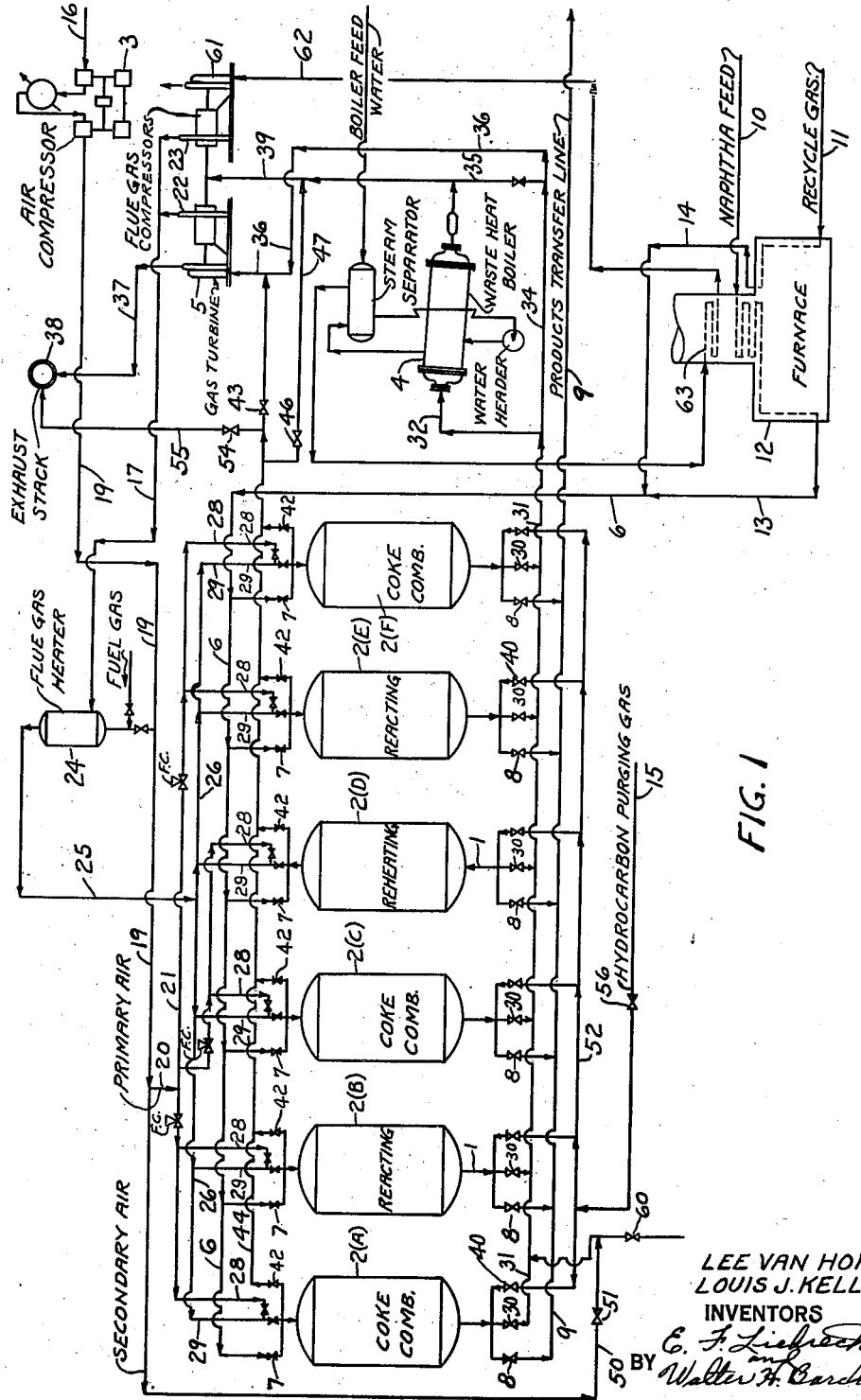

Sept. 5, 1944.        L. VAN HORN ET AL        2,357,365
CATALYTIC METHOD
Filed Dec. 14, 1940        3 Sheets-Sheet 1

LEE VAN HORN.
LOUIS J. KELLY.
INVENTORS

ATTORNEY

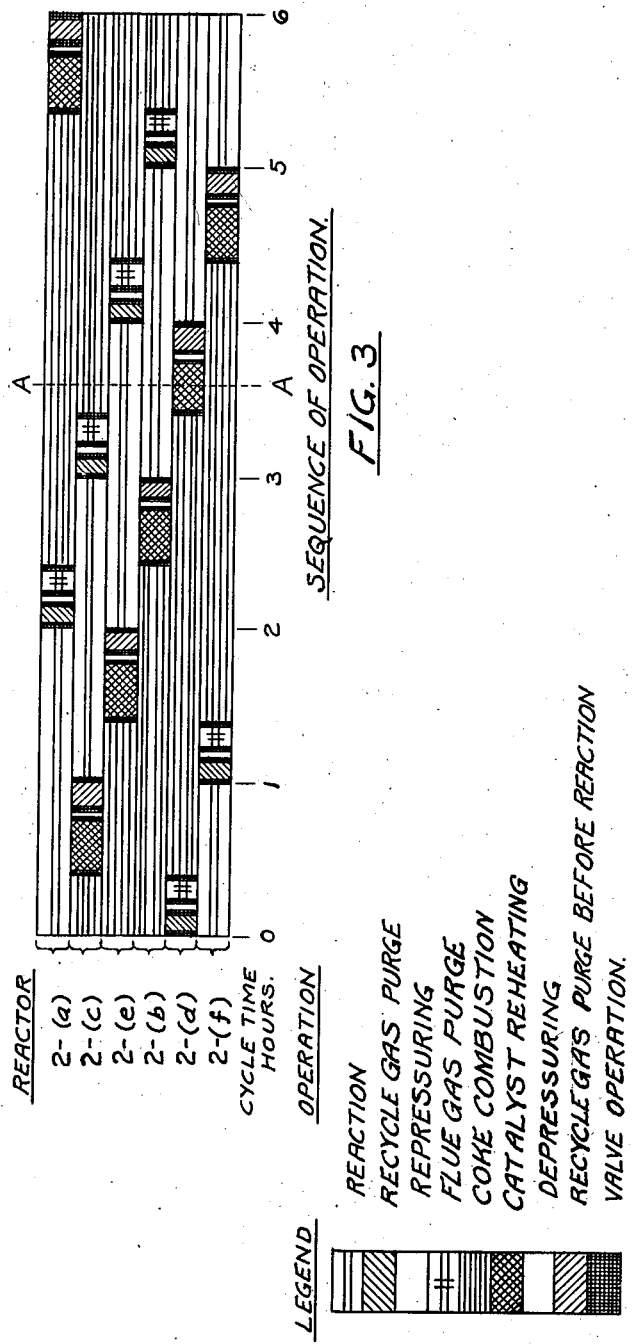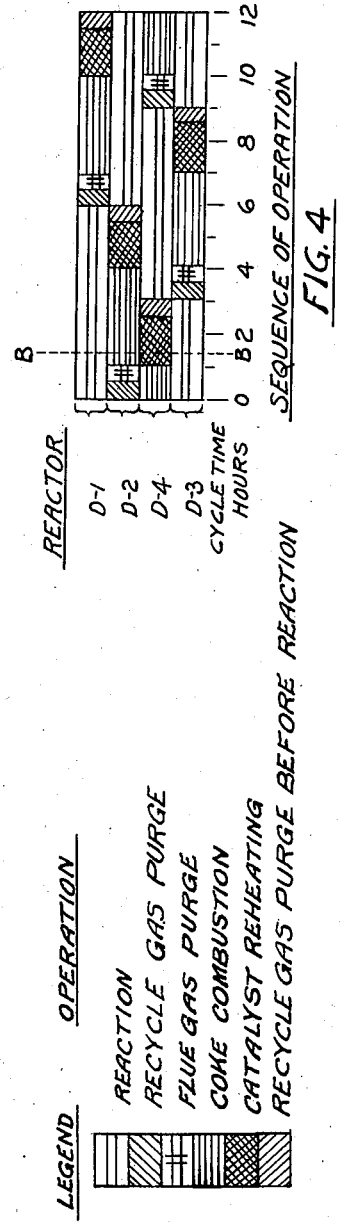

Patented Sept. 5, 1944

2,357,365

UNITED STATES PATENT OFFICE 2,357,365

CATALYTIC METHOD

Lee Van Horn, Westfield, and Louis J. Kelly, Tenafly, N. J., assignors to The M. W. Kellogg Company, Jersey City, N. J., a corporation of Delaware Application December 14, 1940, Serial No. 370,108

11 Claims. (Cl. 196—50)

The present invention relates to a method for effecting chemical reactions in the presence of a solid contact agent or catalyst. More particularly, the invention pertains to improvements in methods for effecting the catalytic conversion of hydrocarbons and analogous processes in a catalytic system in which the catalytic reactors are alternately engaged in an onstream period wherein the desired conversion is obtained by passing the hydrocarbons in contact with the catalyst, and a regeneration period wherein combustible substance such as carbonaceous material, sulfur and the like, deposited during the conversion period are removed by combustion.

In some of its aspects the present invention may be regarded as directed to improvements on the method described in our copending application, Serial No. 326,854, filed March 30, 1940. Said application describes a catalytic system suitable for the catalytic reforming of naphtha and other catalytic operations comprising two reactors which are alternately placed on-stream and on regeneration, thereby obtaining continuous operation. Among the features of the method described in said application are, (a) Control of the temperature of the regeneration zone within required limits by removing the heat of regeneration by the circulation of a mixture of air, and an inert gas such as flue gas, (b) The recovery of heat from the circulated regenerating gas, and (c) The provision and utilization of a flue gas heater and producer in the circulatory gas system in such a manner that heat may be recovered from the system at an efficient and uniform rate.

One of the objects and advantages of our present invention is the elimination of any necessity for employing a flue gas producer or heater during the regeneration operation.

A further object and advantage of this invention is the provision of a method whereby a relatively uniform combustion of the combustible deposit on the catalyst is effected throughout the complete operating cycle with accompanying advantages in the utilization of the combustion gases in other stages of the operating cycle and the attainment of greater efficiency in the recovery of energy contained in the combustion gases.

Further objects, advantages, and features of our invention will be apparent from the following detailed description thereof.

The preferred mode of practicing our invention may be best exemplified and is hereafter described with reference to the treatment of a naphtha to increase its octane number or decrease its sulfur content, or both, by catalytic conversion processes such as described in the copending applications Serial No. 358,750, filed September 28, 1940, and Serial No. 294,784, filed September 13, 1939, now U. S. Patent 2,320,147. While the invention is especially advantageous as so applied, it may be utilized to advantage in connection with a wide variety of catalytic hydrocarbon conversion reactions such as the catalytic cracking of high boiling hydrocarbons to lower boiling hydrocarbons within the gasoline boiling range, catalytic desulfurizatin reactions generally, and analogous catalytic conversions involving similar catalyst regeneration problems.

Figure 2:
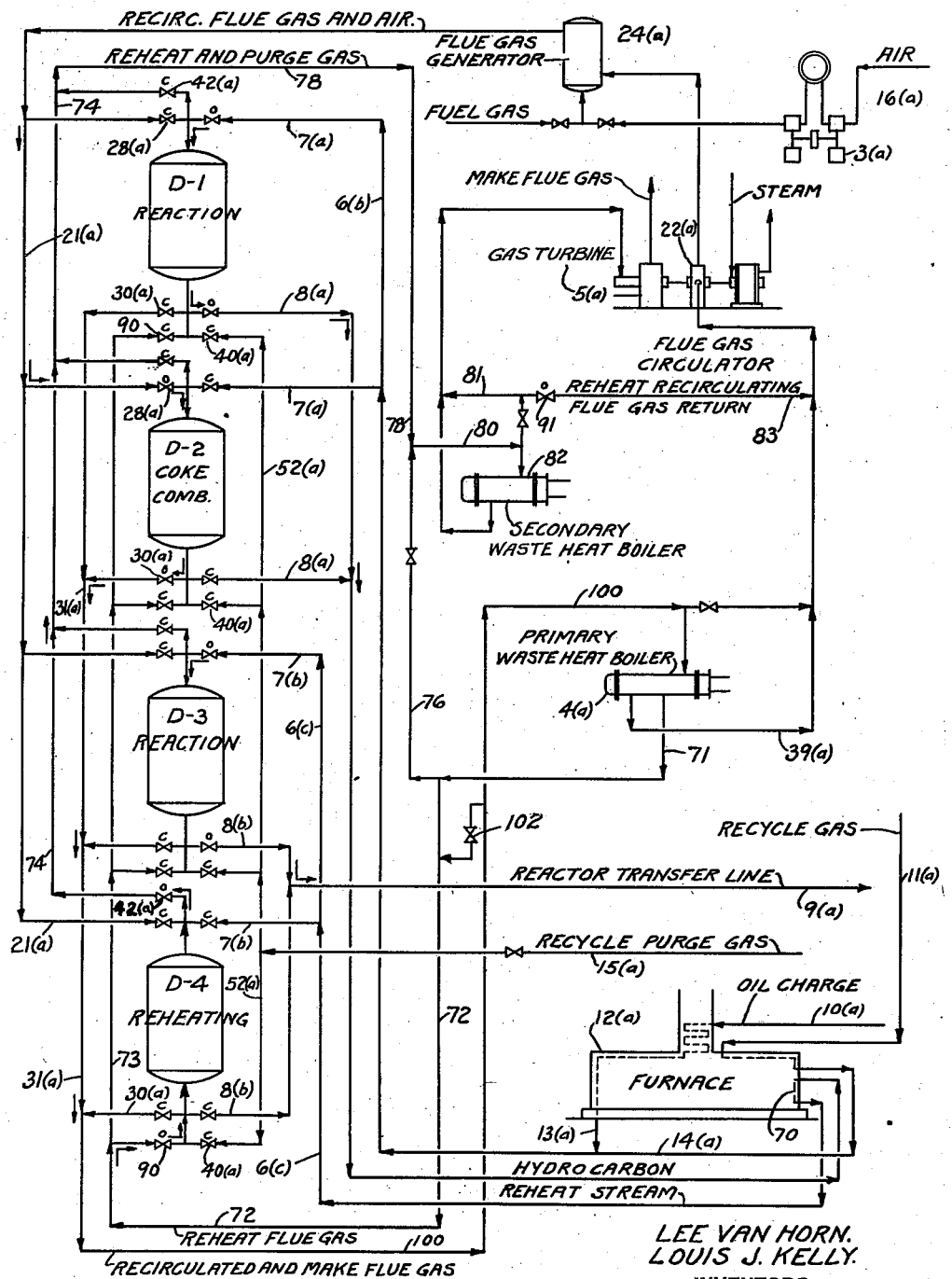

Referring to the appended drawings, Fig. 1 illustrates diagrammatically a suitable arrangement of apparatus for the practice of the invention including a series of catalytic reactors and auxiliary regeneration equipment;

Fig. 2 illustrates a modified arrangement of apparatus suitable for the practice of the invention; and Figs. 3 and 4 are charts which illustrate a typical sequence of steps in each of the reactors of the series shown in Figs. 1 and 2, respectively, throughout the operating cycle.

The principal elements of the apparatus illustrated in Fig. 1 of the drawings are a furnace 12 for supplying the hydrocarbon reactants at a suitable temperature, a series of catalytic reactors 2(A)—2(F) of similar construction and manifolded with valved inlet and outlet gas lines so that each reactor may be passed successively through all of the steps of the complete operating cycle, means for supplying and circulating a mixture of air and an inert gas through the reactor system including an air compressor 3 and flue gas compressors 22 and 23, and means for recovering energy and cooling the effluent hot regeneration gas including a waste heat boiler 4 and a flue gas turbine 5.

A definite program of operations is maintained for each reactor in passing through the complete operating cycle. These operations may be suitably controlled by a program controller or timing mechanism which operates motor-operated valves provided on the valved inlet and outlet lines to the reactors. The control system is not illustrated since it may be of standard construction. Although the program of operations for each reactor is the same as for all the others, the operation of the series is preferably such, for example when six reactors are employed as shown, that at any time two reactors are reacting, three are regenerating, and one is engaged in intermediate and preparatory operations such as pressuring, depressuring, purging, or reheating. While the number of reactors and sequence of operations in the individual reaction may be varied, both of these factors are preferably controlled so that regeneration proceeds continuously or substantially continuously throughout the cycle, and preferably a plurality of reactors is at all times engaged in the regeneration stage. Likewise, a plurality of reactors is preferably engaged in the reaction stages at all times in the operating cycle as illustrated by Fig. 3.

The complete process flow may be most readily understood by first considering the flow in connection with the two primary steps of converting hydrocarbons and removing combustible material deposited during the conversion reaction. The complete process preferably includes intermediate steps which are supplementary and preparatory to these two primary steps, the latter normally consuming by far the greater portion of the complete operating cycle.

During the conversion period, the hydrocarbon vapors undergoing treatment are supplied to the main reactants inlet line 6 having individual valved lines 7 leading therefrom to each reactor. From opened valved lines 7, the reactants pass downwardly through the reactor in intimate contact with a catalytic mass contained therein, undergoing the desired conversion therein, and then exit from the reactor through the valved conversion products outlet lines 8 which open into the main products transfer line 9. The products may be conveyed by transfer line 9 to any suitable products separating and recovering system including, for example, a gas separator, fractionator and the like. Throughout the operating cycle, a plurality of reactors is preferably maintained in the conversion or on-stream stage at all times by maintaining at least two or more of the inlet valved lines 7 and outlet valved lines 8 open. The use of this feature is illustrated by the time-sequence chart shown in Fig. 3 for six reactors operating on a naphtha reforming and desulfurizing reaction such as described in said copending Layng et al., application Serial No. 358,750, filed September 28, 1940. In Fig. 1, the individual reactors are shown at an instant of the operating cycle corresponding to line A—A on the sequence chart in Fig. 3.

In a conversion operation of the type described in said application, reactants including naphtha and a recycle gas containing hydrogen are supplied through lines 10 and 11, respectively, to heating coils in furnace 12. After being brought to a suitable conversion temperature the reactants are withdrawn from the furnace through lines 13 and 14 and passed to the reactors through main inlet line 6 and through opened valved lines 7 of the particular reactors on the conversion stage. During the passage of these reactants through the catalytic reactors 2 a certain proportion of the charge is converted to coke or a carbonaceous deposit on the catalyst and in some instances a substantial proportion of the metallic catalyst compound, dependent on the type catalyst employed, is converted to a sulfide by sulfur present in the charging stock. The effluent conversion products transferred through line 9 may be separated into a liquid product constituting a high quality motor fuel, and normally gaseous products including a gas fraction rich in hydrogen utilized as the recycle gas supplied through line 11 and as a purging medium to line 15. The catalyst employed in this type of conversion is preferably one capable of catalyzing the dehydrogenation and cyclization of aliphatic hydrocarbons containing 6 to 12 carbon atoms to aromatic compounds having a corresponding number of carbon atoms, as for example, molybdenum oxide or chromium oxide supported on a suitable carrier such as Activated Alumina.

The temperatures preferably maintained in the conversion zone are normally lower than the maximum safe temperature usable in the combustion stage. The pressure maintained during the conversion stage may be the same, or higher or lower than the pressure maintained during the combustion stage. In the type of naphtha conversion involving substantial desulfurization specifically referred to above, we prefer to maintain a superatmospheric pressure during the conversion stage of about 100 to 150 pounds per square inch gauge compared to a preferred range of superatmospheric pressure somewhat higher in the combustion stage for example about 185 pounds. A typical set of operating conditions maintained in the conversion stage in the combined desulfurizing and reforming of a cracked naphtha, are (1) Pressure_____lbs./sq. in. gauge__ 100
(2) Average temperature_____°F__ 985
(3) Volume of naphtha charged measured on a liquid basis to unit volume of catalyst__ 0.6
(4) Mols of recycled hydrogen/mol of naphtha charged _____ 3.0

During the combustion period, a mixture of cooled recirculated flue gas and air is supplied to the reactors in the regeneration stage, the air entering the system through line 16 and the recirculated flue gas through line 17. The mixture is supplied at a temperature sufficiently high to initiate combustion of the combustible deposit but preferably at a temperature substantially below the maximum safe regeneration temperature, for example at a temperature of about 700° F. as compared with a typical safe regeneration temperature of about 1100° F. The mixture is further preferably supplied at and the reactors maintained under a substantial superatmospheric pressure, for example within the range of about 30 to 250 pounds per square inch gauge, as for example 185 pounds per square inch gauge. The quantity of oxygen in the mixture is proportioned so as to keep the temperature of regeneration below the required upper limit, this quantity normally being about 1–2% by volume.

Air supplied through line 16 is compressed to the desired superatmospheric pressure by air compressor 3 and is then conducted by lines 19 and 20 to air manifold line 21. The recirculated flue gas is compressed to the desired pressure by flue gas compressors 22 and 23 and passes by line 17 to a flue gas heater 24 and then by line 25 into the flue gas manifold line 26. Flue gas heater and producer 24 is operated normally only during the "starting up" procedure, and at all other times the recirculated flue gas passes therethrough unchanged.

The air manifold line 21 is provided with individual valved lines 28 leading into each reactor. Flue gas manifold line 26 is similarly provided with individual valved lines 29 leading into each reactor. The sequence of operations is preferably such that at least two or more of the reactors (as shown in Figure 1, reactors 2(A), 2(C) and 2(F)) are engaged in the combustion period at all times during the course of the operation by maintaining valved lines 28 and 29 leading to these particular reactors open. A feature of the specific arrangement shown in Fig. 1 is the use of only a single flow controller on the air inlet line indicated by the symbol F. C. on each of the three adjacent pairs of reactors. By this arrangement one reactor of each pair is engaged on the regeneration stage at all times during the operating cycle, for example, reactors 2(A), 2(C) and 2(F) at the instant indicated by line A—A. The number of flow controllers and labor required for their operation is thereby reduced.

The mixture of air and flue gas passes downwardly through the reactors and is gradually increased in temperature by absorption of the heat of regeneration therein as sensible heat in the gas mixture, conditions being preferably maintained such that the effluent gas approximates the safe regeneration temperature, for example a temperature of about 1100° F. The combustion gases are withdrawn from the bottom of the reactor through the valved flue gas outlet lines 30 each of which discharges into the main flue gas outlet line 31. The pressure in line 30 is preferably regulated by conventional pressure control means (not shown) in such manner as to maintain the reactor under a substantially superatmospheric pressure during the combustion period, for example, a pressure of the order of about 160 pounds per square inch gauge.

The stream of combustion products in line 31 is split, one portion constituting that recirculated to the reactor system being cooled by passage through line 32 to a waste heat boiler 4. The remaining part of the split stream passes by line 34 to line 36 leading into a flue gas turbine or work engine 5. Valved by-pass line 35 serves as a temperature control for maintaining a desired maximum boiler outlet temperature, preferably about 700° F. In passing through turbine 5, a substantial proportion of the energy content of the flue gas is recovered, the gas then leaving the turbine through line 37 at a reduced temperature and pressure to exhaust stack 38, thereby constituting the "make" flue gas of the system. From waste heat boiler 4 wherein it is cooled to a temperature approximating the ignition temperature of the spent catalyst, for example about 700° F., the recirculated portion of the flue gas stream passes through line 39 to compressors 22 and 23 which compress it and circulate it to the reactors by line 17 as previously described. Steam produced in boiler 4 may suitably be used for driving a steam turbine 61 connected to the flue gas circulator, being supplied thereto by line 62 after superheating if desired in heating coil 63 in furnace 12. Because of the corrosive nature of sulfur-containing gases, when substantial desulfurization is involved, a relatively high pressure steam is preferably produced, for example, about 400 pounds gauge, thereby avoiding condensation in the flue gas lines.

In addition to the primary operations of conversion and regeneration the process includes steps preparatory to these two operations, the complete operating cycle, for example, may suitably include the following steps:

1. On-stream reaction or conversion period.
2. Hydrocarbon purge by recycle gas after reaction.
3. Repressuring.
4. Inert or flue gas purge.
5. Combustion of coke or regeneration.
6. Reheating.
7. Depressuring.
8. Purge with recycle gas before reaction.

Step 2 above, hydrocarbon purge after reaction, serves the purpose of removing reactants left in the reactor after the conversion step. A preferred purging medium for this purpose consists of a recycled fraction containing hydrogen and gaseous hydrocarbons separated in the process as previously described, and introduced through line 15. The purging gas is preferably introduced at a pressure higher than that maintained during the conversion, for example a pressure of 200 lbs. per square inch compared with a conversion pressure of 100–150 lbs. per square inch, whereby the purged material may be recovered by transferring it to a reactor or reactors operating on the conversion step. The purging medium is introduced by closing valved line 8 and then opening valve 40 of the reactor to be purged and valve 56 in line 15, whereupon the purging gas flows into and through the reactor and out through open inlet reactants valve 7 into transfer line 6 from which it passes into the particular reactor or reactors operating on conversion and from thence into the products recovery system through line 9, thereby recovering and completing the conversion of all purged material.

Step 3, repressuring, serves the purpose of adjusting the pressure of the reactor to that desired for regeneration. In this step valve 7 is closed thus stopping the flow out of the reactor to line 6 and valved line 42 opened, and the flow of purging medium is continued for the relatively short period necessary to bring the reactor to the desired pressure, for example about 175 lbs. per square inch. The vent line 44 is repressured along with the reactor since valves 43, 46 and 54 were closed during the preceding step.

Step 4, inert gas purge, serves to displace the hydrocarbon purging medium remaining in the reactor. After closing valve 40, valves 30 and 43 are opened, valve 42 being left opened, and hot regeneration gas from a reactor or reactors undergoing coke combustion is permitted to flow through transfer line 31 into the reactor and out through line 44 and open valve 43 into the flue gas turbine 5.

After the inert gas purge, the reactor is in readiness for the coke combustion step which is carried out as previously described.

After regeneration, the catalyst bed is at a temperature approximating that of the entering air-flue gas mixture, for example, a temperature of about 700° F., a greater pressure, for example, about 175 lbs. per square inch, than the desired reaction pressure, and under an atmosphere of flue gas. In preparation for the conversion stage, the catalyst bed is preferably reheated to the required reaction temperature, the pressure reduced to reaction pressure, and the flue gas atmosphere replaced with recycled gas.

In step 6, reheating, valves 30, 42 and 46, are opened, whereby hot regeneration gas from a reactor or reactors on coke-combustion (step 5) is passed through transfer line 31 to the reactor that is to be reheated and is then passed by line 44 to the recirculated flue gas line 39 by line 47. The flow of hot flue gas is continued until the catalyst bed is brought up to the required on-stream temperature. In certain instances, it has been found desirable to burn off during the reheat step residual coke not removed during the primary combustion step, and this may be effected by simultaneously introducing along with the reheat flue gas a suitable amount of air through secondary air line 50, through opened valve 51 into manifold 31, and then into the reactor through opened valve 30. In this combination secondary combustion and reheat step, the flow of regenerating gas thus effected is in a direction opposite to the flow during primary combustion period. A temperature adjusting medium such as steam, or cooled flue gas produced in the system, may likewise be introduced through line 60.

Step 7, depressuring, is a continuation of the reheating step except that valves 30, 46, 51 and 60, are closed and valve 54 in line 55 leading to the exhaust stack is opened. A suitable depressuring control device (not shown) is located in line 55 to control the rate of depressuring to the pressure desired for conversion.

In step 8, purge with recycle gas before reaction, valve 56 is opened, and valves 40, 42 and 36 are left opened, and hydrocarbon purging gas introduced through line 19 flows up through the catalyst bed and out to the exhaust stack through line 55, thereby purging the reactor of flue gas. Valves 42 and 40 are then closed which places the reactor in readiness for the conversion stage previously described.

In the modified embodiment of the invention illustrated in Fig. 2, four reaction chambers are employed. This embodiment is especially applicable to the conversion of low octane naphtha stocks to high octane naphthas by a dehydroaromatization reaction such as described in co-pending application Serial No. 294,784, now U. S. Patent 2,320,147. The legends on each of the chambers indicate a period of the operating cycle corresponding to that indicated by line B—B of Fig. 4. The flow through the system at this particular instant is shown by the position of the valves, a closed valve being indicated with a "C" and opened valves with an "O." The flow is further indicated by the small arrows placed adjacent the lines and the numbering of elements corresponding in function to those elements having a generally similar function in Fig. 1 with a similar numeral and a subscript letter, such as 10(a) to indicate the hydrocarbon or naphtha feed line.

In this modification, two reactors are on-stream and one reactor on coke combustion throughout the operating cycle. Hence in this modification, similarly to Fig. 1, coke combustion takes place and a supply of hot flue gas for power production, reheating, and for purging purposes is made available throughout the complete cycle, and flue gas heater and producer 24(a) is normally used only during the starting up period.

Since the flow in Fig. 2 is generally similar to that of Fig. 1, for an understanding thereof, it is sufficient to indicate the particular features wherein it differs from Fig. 1. In the modified flow, it will be noted that the mixture of hydrocarbon feed and recycle gas travels through two reactors consecutively or in series, the stream being reheated in furnace coil 76 between conversion stages, hence lines 6(b) and 6(c) correspond to inlet reactants manifold 6, and lines 8(a) and 8(b) to reactants outlet line 8.

In the coke combustion step, a mixture of recirculated flue gas and air is supplied to the manifold line 21(a), and the products of combustion withdrawn through manifold line 31(a). The flow thereafter differs from Fig. 1 in that the total stream of combustion products is passed by line 100 to a waste heat boiler 4(a). The stream is split during its passage through the boiler, a partly cooled stream being withdrawn by line 71 as a source of flue gas for reheating and for driving flue gas turbine 5(a). Reheat flue gas is passed to the reactor system through line 72 and into inlet manifold line 73 and exits from the reactor system through outlet manifold line 74. The more completely cooled stream is withdrawn from the waste heat boiler through line 39(a) and passed to the flue gas circulator 22(a). The part of the flue gas passing through line 71 not utilized for reheating is passed through line 76 and mixed with effluent reheat and inert purge gases in line 78 and the mixture passed to line 80. Dependent upon the temperature of incoming gas in line 80, and the temperature and flue gas requirements of the system, this gas is passed in the required amounts either directly to the flue gas turbine through line 81 or further cooled in a secondary waste heat boiler 82, or passed to the recirculating flue gas line 39(a) by line 83.

The process flow in connection with Fig. 2 will be evident from a consideration of the operations on reactor D—1 and the sequence chart Fig. 4. Although the operations on only one reactor, D—1, are described for the complete cycle, the operations being performed simultaneously in any of the other reactors may be readily ascertained by reference to Fig. 4. As indicated on the sequence chart, it will be considered that the sequence commences with the reaction period, during the first three hours of which reactor D—1 is in series with D—3 and during the second three hours, with D—4. Reactor D—1 is always first in series when it is on reaction, as is also D—2. During the reaction period of six hours, no valve changes are made on the reactor itself.

At the end of the reaction period of D—1, the reaction valves of D—2 are opened about one minute before those of D—1 are closed, resulting in momentarily parallel operation of D—1 and D—2 to produce a smooth changeover. Reaction in D—1 is terminated by closing of the outlet (bottom) reaction valved line 8(a), the inlet reaction valved line 7(a) acting now as an outlet valved line leading to D—2, remaining open during the next step in the sequence, purging of residual reaction products by means of a hydrocarbon or recycle gas, initiated by opening valved line 40(a) at the bottom of the reactor.

The latter purging step is accomplished by means of a small flow of recycle gas under flow-control which continues for twenty minutes and displaces most of the original vaporous contents of the reactor over into the inlet of the reactor which has been put on reaction a few minutes before. This purging step is terminated by closing the purge inlet valved line 40(a) and the main reaction inlet valved line 7(a).

The next step in the sequence is purging with flue gas to remove gaseous hydrocarbons from the reactor before combustion is started. This step is begun by opening the purge and reheat gas outlet valved line 42(a) and the corresponding inlet valved line 90. This purge is accomplished by allowing flue gas from manifold line 73 to pass through the reactor. The resulting mixture of hydrocarbon gases and flue gases is passed out of the reactor system through line 78 to the flue gas turbine 5(a). Like the hydrocarbon purge, this purge may consume fifteen minutes, at the end of which time the purge inlet and outlet valved lines 42(a) and 90 are closed and the reactor is ready for coke burning.

Coke burning is commenced by opening the recirculation flue gas-air mixture inlet and outlet valved lines 28(a) and 30(a), thus allowing a mixture of recirculation gas and air to enter the reactor. The mixture may suitably contain about 2 mol per cent of oxygen which is consumed by the combustion reactions in the reactor, so that a substantially oxygen-free flue gas leaves by line 30(a). The coke-burning period is designed to cover a period of three hours, at the end of which time the catalyst is completely regenerated and needs only to be reheated to average reaction temperature before being ready for use. If desired in this modification, it will be apparent that a secondary combustion reheat step may be employed similar to that previously described in connection with Figure 1.

Coke burning is terminated by closing valved lines 28(a) and 30(a), after which valved lines 91, 42(a) and 90, are opened to start reheating. The two last-named lines are the same as were employed in the purge with flue gas during which only the make gas passed through the reactor. Now, however, it is normally necessary to pass through a greatly increased quantity of flue gas in order to provide heat for the catalyst mass, hence part of the main recirculation flue gas stream may be diverted through the reactor to supplement the make gas, through a suitable valved by-pass line 102. After leaving boiler 82, the flue gas stream splits, the portion equivalent to the make gas passing out of the system through the turbine, while the balance of the gas (that portion diverted from the recirculation gas) is returned to the recirculation gas system through valved line 91. The quantity of diverted gas passing through valved line 91 is regulated by controlling the pressure drop in the main recirculating system so as to divert the desired quantity through the repeat circuit.

The valve in line 76 is opened before valved lines 91 and 90 are closed. When the catalyst bed has been heated to the desired temperature, which is expected to consume one hour, valved lines 91 and 90 are closed, leaving the reactor full of flue gas. Preferably, the reactor should contain a hydrocarbon gas at the moment reaction starts. Therefore, reheating is followed by a purge with hydrocarbon or a recycle gas, using the same source and quantity of gas and the same time as in the previous purge with a hydrocarbon or recycle gas. This purge differs from the first in that the gases displaced from the reactor pass out to the atmosphere through the flue gas turbine via valved line 42(a), which is left open after reheating is finished.

The final hydrocarbon purge is terminated by the closing of valved lines 90 and 42(a), whereupon the reactor is ready for immediate switching into the reaction system by opening of valved lines 7(a) and 8(a), putting it in parallel with reactor D—2 for the moment, before D—2 is removed from the system. The reaction is thus returned to the starting point of the sequence, twelve hours after it was started.

It will be apparent that operating in accordance with the systems and procedure described in the foregoing has a number of important features and advantages. While the conjoint use of these features is highly advantageous, it will be apparent that various features of the process are susceptible of distinct and separate applications.

Among these features may be particularly noted the effecting of coke combustion continuously throughout the cycle, thereby providing a constant source of hot flue gas and under suitable high pressure for utilization in power recovery, purging and reheating. The size and hence the cost of the elements utilized in the coke combustion and power recovery operations including the air compressor, circulating blower, valves and piping are substantially reduced. Likewise, the size of the peak load and power requirements for driving the air compressor and flue gas blower are substantially reduced.

Variations in quantity and quality of products including recycle gas as well as hydrocarbon products are advantageously decreased since only part (one-half, as shown by Figs. 3 and 4) of the active catalyst capacity is placed in reaction at any given point in the cycle, thereby minimizing the difference in product distribution normally produced in reacting over freshly regenerated catalyst compared with reacting over the partially used catalyst present in the intermediate portions of the reaction step.

A further outstanding feature of the process is that involving the use of a relatively cool mixture of flue gas and oxygen to effect regeneration, and the direct utilization of hot flue gas from another reactor operating on the regeneration stage to reheat the catalyst. An advantageous modification of this feature consists in effecting only partial combustion of the carbonaceous deposit during the regeneration stage and completing the combustion to the required extent during the reheating operation.

Another important aspect of the process resides in the purge of reactants left in the reactor after completion of the conversion stage directly into another chamber operating on the conversion stage, thereby assuring the recovery and complete conversion of the purged products.

While the features noted above are regarded as some of the more important aspects of the process it is to be understood that it is not our intention to disclaim any of the novel subject matter thereof.

We claim:

1. A process for effecting the catalytic conversion of hydrocarbons utilizing a system including three or more chambers having a mass of catalyst therein and which are operated in parallel by being alternately placed on-stream and on regeneration to remove carbonaceous material deposited on the catalyst during the on-stream period, which comprises regenerating the catalyst by introducing a mixture of air and cooled effluent regeneration gas into the spent catalytic mass at a temperature sufficiently high to support combustion of the carbonaceous deposit but substantially lower than the maximum safe regeneration temperature whereby the combustion of the deposit is initiated, continuing the passage of said gas into the catalytic mass until the carbonaceous deposit thereon is reduced to the desired extent by progressive burning of the deposit in the direction of gas flow whereby the temperature of the catalyst is brought to a temperature approximating that of the entering gases, maintaining at least one of said chambers in said regenerating operation throughout the operating cycle, and increasing the temperature of the catalyst mass upon completion of said regeneration operation by passing into contact therewith hot regeneration gases withdrawn from another reactor operating on said regenerating operation.

2. A process for effecting the catalytic conversion of hydrocarbons utilizing a system including three or more chambers having a mass of catalyst therein and which are operated in parallel by being alternately placed on-stream and on regeneration to remove carbonaceous material deposited on the catalyst during the on-stream period, which comprises cooling effluent hot regeneration gas withdrawn from a chamber operating on the regeneration stage, passing a mixture of the cooled regeneration gas and air into a spent catalytic mass at a temperature sufficiently high to support combustion of the carbonaceous deposit but substantially lower than the maximum safe regeneration temperature whereby the combustion of the deposit is initiated, continuing the passage of said gas into the catalytic mass until the carbonaceous deposit thereon is reduced to the desired extent by progressive burning of the deposit in the direction of gas flow whereby the temperature of the catalyst is brought to a temperature approximating that of the entering gases, maintaining at least one of said chambers in said regenerating operation throughout the operating cycle, and increasing the temperature of the catalyst mass upon completion of said regeneration operation by passing into contact therewith hot regeneration gases withdrawn from another reactor operating on said regenerating operation.

3. A process for effecting the catalytic conversion of hydrocarbons utilizing a system including a plurality of chambers having a mass of catalyst therein and operated in parallel by being alternately placed on-stream and on regeneration to remove carbonaceous material deposited on the catalyst during the on-stream period, the method of preparing a chamber after completion of the conversion operation therein for the subsequent regenerating operation comprising passing a stream of a purging medium through said chamber at a pressure higher than the conversion pressure and then introducing said purging medium and purged products into a chamber operating on the conversion stage.

4. A process for effecting the catalytic conversion of naphtha in the vapor phase at superatmospheric pressures and in the presence of a dehydrogenating and cyclicizing catalyst, utilizing a system including a plurality of chambers having a mass of catalyst therein and operated in parallel by being alternately placed on-stream and on regeneration to remove carbonaceous material deposited on the catalyst during the on-stream period, the method of preparing a chamber after completion of the conversion operation therein for the subsequent regenerating operation comprising passing a stream of a purging medium through said chamber at a pressure higher than said conversion pressure and then introducing said purging medium and purged products into a chamber operating on the conversion stage.

5. A process as defined in claim 4 wherein said purging medium comprises a recycled hydrogen-containing gas produced in the conversion stage.

6. A process for effecting the catalytic conversion of hydrocarbons utilizing a system including a plurality of chambers having a mass of catalyst therein and operated in parallel by being alternately placed on-stream and on regeneration to remove carbonaceous material deposited on the catalyst during the on-stream period, which comprises introducing an oxygen-containing gas into the spent catalytic mass at a temperature sufficiently high to support combustion of the carbonaceous deposit but substantially lower than the maximum safe regeneration temperature and the required conversion temperature whereby the combustion of the deposit is initiated, continuing the introduction of said gas until the amount of carbonaceous material is reduced to a substantial extent by progressive burning of the deposit in the direction of gas flow but not to the required minimum and the temperature of the catalyst mass is brought to a temperature approximating the temperature of the entering gas, and then reheating said mass to a temperature approximating the desired conversion temperature by passing in contact therewith in a direction opposite to that of the initial flow a hot flue gas containing oxygen in amount sufficient to complete the burning of the carbonaceous deposit to the required extent.

7. A process as defined in claim 6 wherein the hot flue gas utilized in reheating is withdrawn from another reactor operating on an intermediate stage of regeneration.

8. A process for effecting the catalytic conversion of naphtha in the presence of added hydrogen and a dehydrogenating and cyclicizing catalyst at a reaction temperature within the range of about 875° to 1075° F., utilizing a reaction system including at least four chambers having a mass of the catalyst therein and operated in parallel by being alternately placed on-stream and on regeneration to remove carbonaceous material deposited on the catalyst during the on-stream period which comprises carrying each chamber through the following successive steps, passing a vaporous mixture of naphtha and hydrogen through the chamber until carbonaceous material is deposited on the catalyst to a degree where regeneration is desirable, passing a purging medium comprising a recycled hydrogen-containing gas produced in the conversion stage through said chamber at a pressure higher than said conversion pressure and then introducing said purging medium and purged products directly into a chamber operating on the conversion stage, passing a purging medium comprising flue gas produced from another reactor operating on an intermediate stage of regeneration through said chamber to displace combustible gases, introducing a mixture of air and a cooled effluent flue gas derived from the regeneration stage of another reactor into the spent catalytic mass at a temperature sufficiently high to support combustion of the carbonaceous deposit but substantially lower than the maximum safe regeneration temperature and the required conversion temperature whereby the combustion of the deposit is initiated, continuing the introduction of said gas until the amount of carbonaceous material is reduced to a substantial extent by progressive burning of the deposit in the direction of gas flow but not to the required minimum and the temperature of the catalyst mass is brought to a temperature approximating the temperature of the entering gas, and then reheating said mass to a temperature approximating the desired conversion temperature by passing in contact therewith a mixture of air and a hot flue gas derived directly from another chamber operating on the regeneration stage, the amount of said oxygen being sufficient to complete the burning of the carbonaceous deposit to the required extent.

9. A process as defined in claim 6 wherein the gas mixture utilized for reheating comprises a mixture of a hot flue gas withdrawn from another reactor operating on an intermediate stage of regeneration and a cooled flue gas.

10. A process as defined in claim 8 wherein the mixture of naphtha and hydrogen is passed during the conversion stage successively through one of said chambers, a heating coil, and then through another of said chambers.

11. A process as defined in claim 6 wherein said catalyst mass comprises a reforming catalyst and the hydrocarbon charged during said on-stream period comprises a naphtha fraction.

LEE VAN HORN.
LOUIS J. KELLY.